United States Patent
Lowak

(10) Patent No.: US 8,240,742 B2
(45) Date of Patent: Aug. 14, 2012

(54) DEVICE FOR FIXING THE POSITION OF A LID

(75) Inventor: Heiko Lowak, Waldhausen (DE)

(73) Assignee: Audi, AG, Ingolstadt (DE)

( * ) Notice: Subject to any disclaimer, the term of this patent is extended or adjusted under 35 U.S.C. 154(b) by 333 days.

(21) Appl. No.: 12/605,749

(22) Filed: Oct. 26, 2009

(65) Prior Publication Data

US 2010/0171335 A1 Jul. 8, 2010

(30) Foreign Application Priority Data

Oct. 25, 2008 (DE) .......................... 10 2008 053 218

(51) Int. Cl.
*B60J 7/00* (2006.01)

(52) U.S. Cl. ...................................... 296/107.08; 296/76

(58) Field of Classification Search .................... 296/76, 296/107.08
See application file for complete search history.

(56) References Cited

U.S. PATENT DOCUMENTS

| | | | |
|---|---|---|---|
| 5,921,608 A * | 7/1999 | Schmitt et al. | 296/107.08 |
| 6,318,792 B1 * | 11/2001 | Neubrand et al. | 296/107.08 |
| 7,350,845 B1 * | 4/2008 | Duffy | 296/76 |
| 7,367,607 B2 | 5/2008 | Roeder et al. | |
| 7,469,953 B2 * | 12/2008 | Heath et al. | 296/76 |
| 7,753,433 B2 * | 7/2010 | Baumeier | 296/107.08 |
| 7,862,099 B2 * | 1/2011 | Hayashi et al. | 296/107.08 |

FOREIGN PATENT DOCUMENTS

| | | |
|---|---|---|
| DE | 4010276 C2 | 9/1993 |
| DE | 19712185 C1 | 3/1998 |
| DE | 2020006016864 U1 | 12/2006 |
| DE | 102005033537 A1 | 1/2007 |
| DE | 102006009486 A1 | 10/2007 |
| DE | 102007013517 A1 | 9/2008 |
| GB | 2385092 A | 8/2003 |

* cited by examiner

*Primary Examiner* — Lori Lyjak
(74) *Attorney, Agent, or Firm* — Novak Druce + Quigg LLP

(57) ABSTRACT

A device for fixing the position of a lid of a motor vehicle in the closed position, the lid being moveable between an open position and a closed position, in particular the position of the cover of a convertible top compartment, having a component attached to the body of the vehicle, and a component which is attached to the lid and which, when the component attached to the body assumes the closed position, is guided at least in one direction. The component attached to the lid or the component attached to the body has a base plate for connection to the lid or the body and an insertion element connected to the base plate. The base plate can be moved by means of a cam pivoted on the plate relative to the lid or the body. The movement of the cam is limited by two stop elements which are attached to the base plate and which are essentially opposite one another.

17 Claims, 5 Drawing Sheets

DEVICE FOR FIXING THE POSITION OF A LID

The invention relates to a device for fixing the position of a lid of a motor vehicle in the closed position, said lid being moveable between an open position and a closed position.

BACKGROUND OF THE INVENTION

The general prior art discloses such devices which are used to fix the position of a movable lid of the motor vehicle, in particular the lid of a convertible top compartment, in one direction, for example the y direction, i.e., the transverse direction of the vehicle. To ensure exact guidance of the lid, when it is moved into the closed position, it is necessary to adjust the component attached to the lid as precisely as possible relative to the component connected to the body.

To adjust the component connected to the lid it is necessary to loosen it at its attachment points. Then the mechanic must move the component on the lid, re-attach it, and check the relative position of the component attached to the lid compared to the body-mounted component by closing the lid. Since in any loosening of the attachment points the previous adjustment is lost, it is generally necessary to repeat the adjustment, i.e., the loosening and subsequent attachment of the component, several times; this results in very long installation time and thus in the corresponding costs.

Therefore, the object of this invention is to devise a device for fixing the position of a lid of a motor vehicle in the closed position, said lid being moveable between an open position and a closed position, which device enables simple adjustment of the component attached to the lid relative to the component attached to the body.

SUMMARY OF THE INVENTION

The cam according to the invention, which is pivoted on the base plate, makes it easily possible to move the base plate in a controllable manner relative to the lid or the body, since it is sufficient for moving the base plate by means of the cam to only very lightly loosen the connection between the base plate and the lid or the body. By turning the cam a certain amount, high precision adjustments can be made. The two stop elements attached to the base plate generate the displacement of the base plate when the cam is turned.

Therefore, according to the invention, one of the two components of the device according to the invention for fixing the position of a lid can be easily moved in order to fix the lid in its correct location in the closed position.

Very simple attachment of the cam and thus also of the base plate to the lid or body takes place when the cam is connected by means of a screw to the lid or the body in one advantageous development of the invention.

In this connection, especially simple displacement of the base plate can be enabled when the screw is guided in a slot in the base plate.

In order to enable simpler adjustment of the cam for the mechanic, in another very advantageous configuration of the invention, it can be provided that the cam has a scale which displays the relative position of the cam to the base plate.

When it is furthermore provided that the component connected to the body and/or the component connected to the lid has a slanted surface, the lid can be moved more easily into its closed position, since in this way better guidance is guaranteed.

DETAILED DESCRIPTION OF THE PREFERRED EMBODIMENTS OF THE INVENTION

Figure 1:
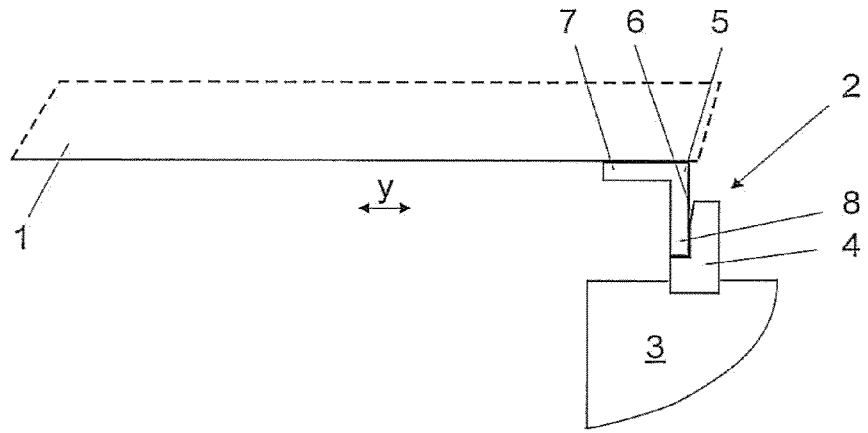
FIG. 1 shows a highly schematic representation of the device according to the invention.
Figure 2:
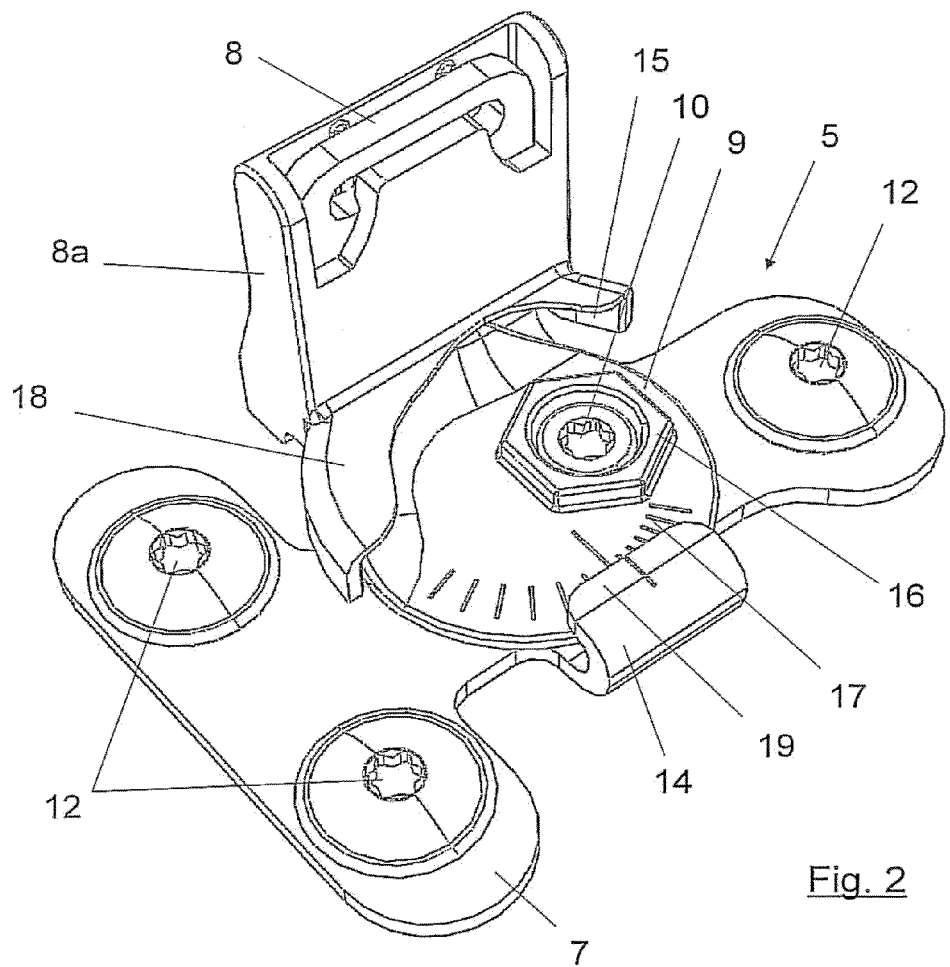
FIG. 2 shows the component of the device according to the invention attached to the lid in a first view.
Figure 3:
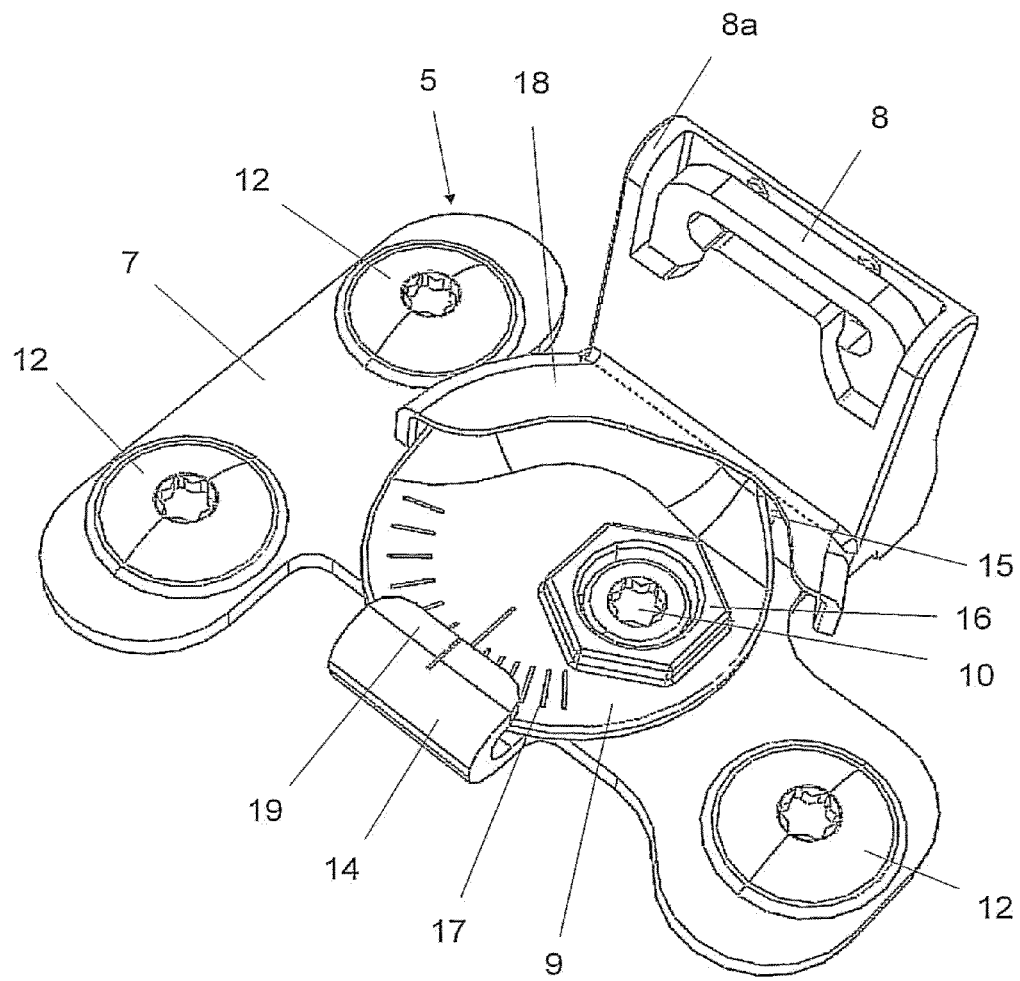
FIG. 3 shows the component in FIG. 2 in a second view.
Figure 4:
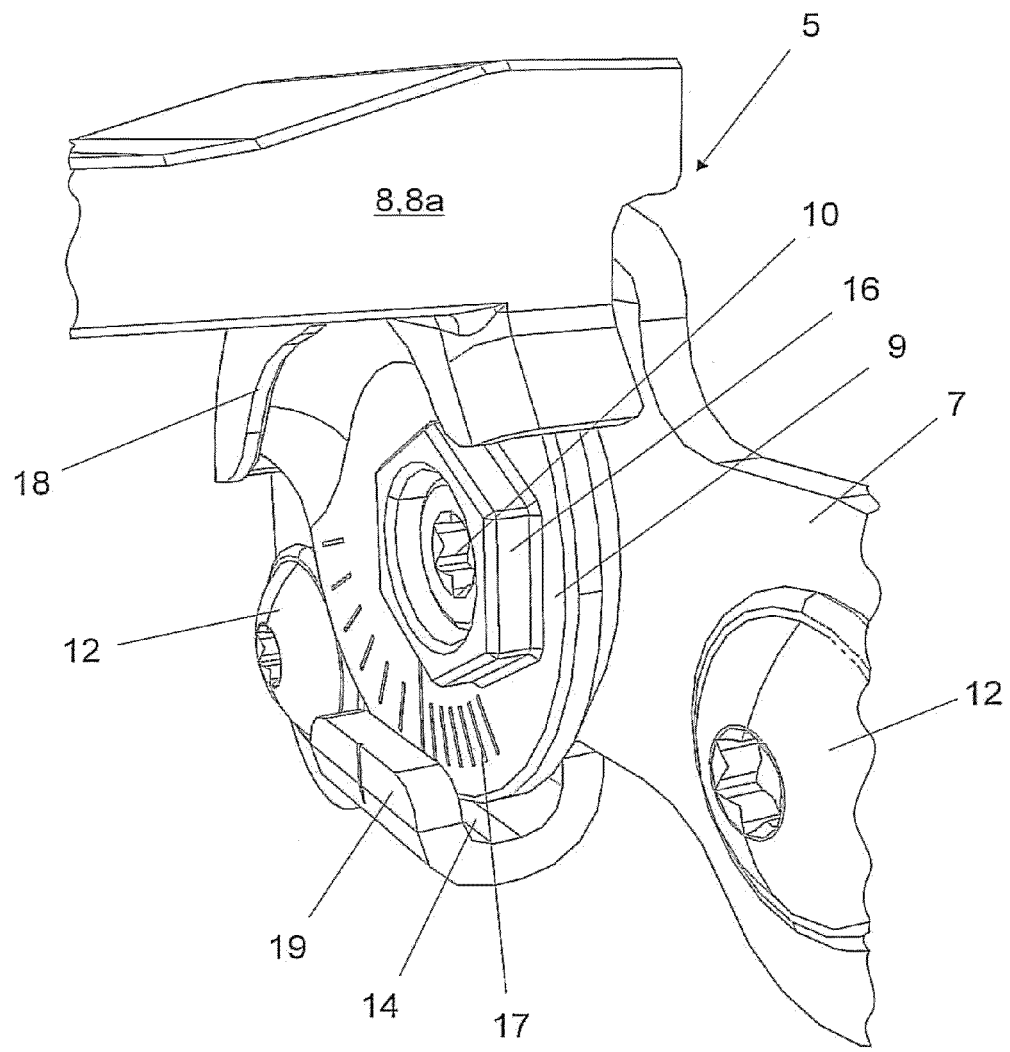
FIG. 4 shows the component in FIG. 2 in a third view.
Figure 5:
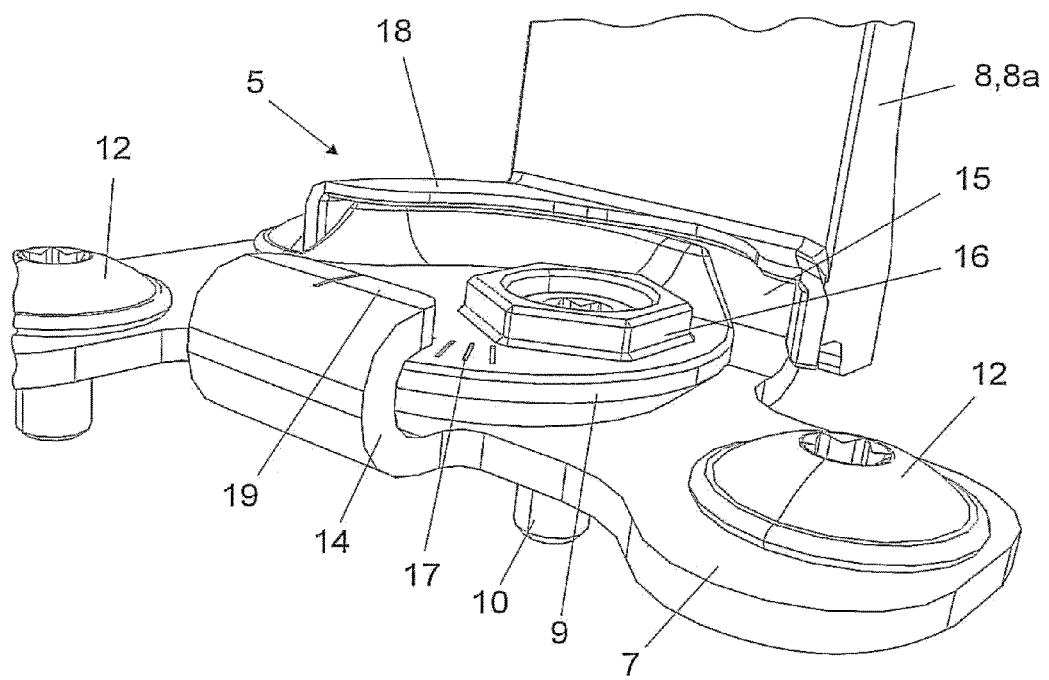
FIG. 5 shows the component in FIG. 2 in a fourth view.
Figure 6:
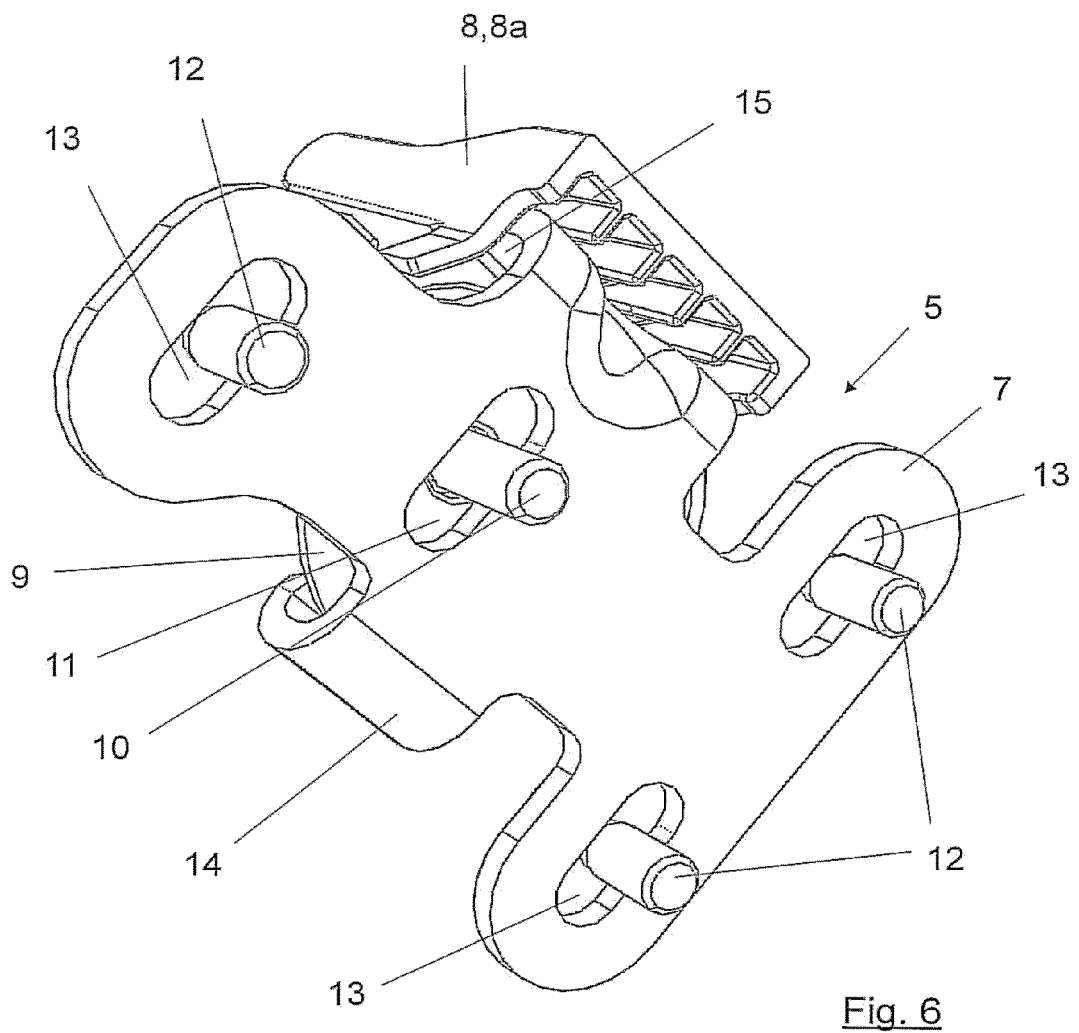
FIG. 6 shows the component in FIG. 2 in a fifth view.

FIG. 1 shows highly schematically the lid 1 of a motor vehicle which is not shown in its entirety, said lid being moveable between an open position shown by means of the broken line and a closed position which is shown by the solid line. The lid 1, in the present case is the lid of a so-called convertible top compartment, i.e., a lid 1 which closes to the top a convertible top compartment in which the convertible top of the vehicle is housed in its open state. Since the lid 1 can even be opened or, in particular, closed in the course of a vehicle speed of up to 50 km/h, a device 2 is necessary which fixes the position of the lid 1 in the closed position.

In the present case, the device 2 has a component 4 which is attached to the body 3 of the vehicle which is suggested only highly schematically and a component 5 which is attached to the lid 1 and which is guided at least in one direction when the component 4 attached to the body 3 assumes the closed position. In the present case, the component 5 is guided in the transverse direction of the vehicle which is designated as "Y" by the component 4. In order to ensure for even greater deviations from the correct position that the lid 1 travels into its closed position, the component 4 on its side facing the component 5 has a slanted surface 6. The component 5 has a base plate 7 for connecting the component 5 to the lid 1 and a guide or insertion element 8 which is connected to the base plate 7 and which comes into contact with component 4 when the lid 1 is closed and thus guides the lid 1 into the correct position. In the present case, the insertion element 8 is provided with a preferably plastic cap 8a in order to avoid wear.

FIGS. 2 to 6 show the component 5 attached to the lid 1 in different perspective views. Here it can be recognized that a disk-shaped cam 9 is pivoted on the base plate 7. The cam 9 which is made, for example, as a plastic injection molded part is connected by means of a screw 10 to the lid 1. As follows from FIG. 6, the screw 10 is guided in a slot 11 in the base plate 7. On the one hand, the screw 10 can prevent movement of the cam 9 relative to the base plate 7 and, on the other hand, there is attachment of the base plate 7 relative to the lid 1. To attach the base plate 7 to the lid 1, moreover, three other screws 12 are used which are likewise guided in the respective slots 13 in the base plate 7, as follows from FIG. 6.

In order to be able to adjust the base plate 7 to the lid 1 with high precision, the movement of the cam 9 is limited by two stop elements 14 and 15 which are attached to the base plate 7 and which are essentially opposite one another. This results in that when the cam 9 is turned it is supported on one of the two stop elements 14 or 15 and in this way moves the base plate 7 and thus the entire component 5 with the insertion element 8 relative to the lid 1. To turn the cam 9 relative to the base plate 7, the cam 9 in the present case has a hexagon 16 which is shifted relative to the center point of the cam 9. The same also applies to the arrangement of the screw 10 which runs through the hexagon 16.

The cam 9 in this embodiment has a scale 17 which displays to the mechanic the relative position of the cam 9 to the base plate 7 and thus simplifies the process in the adjustment of the position of the component 5 to the component 4.

In order to facilitate preinstallation of the entire component 5 with the cam 9, on the base plate 7 a projection 18 which protrudes over part of the cam 9 is attached and is used to hold the cam 9 in its uninstalled state and thus, together with the projection 19 of the first stop element 14, constitutes a safeguard against loss.

The installation and adjustment process of the component 5 on the lid 1 proceeds as follows: First the screws 12 are screwed into the corresponding thread of the lid 1, which thread is not shown, but are not tightened down, so that the component 5 is held by the screws 12 and the screw 10 on its position. Then the screw 10 is loosened to such an extent that it is possible to turn the cam 9 relative to the base plate 7. This turning of the cam 9 is effected with a suitable tool which acts on the hexagon 16 of the cam 9 in order to move the entire component 5 in the y direction. There, the mechanic can read the adjustment path in the y direction on the scale 17 and thus can adjust the predetermined necessary displacement in the y direction as defined. After correct setting of the position of the component 5 both the screw 10 and also the screws 12 are tightened down. In this way only one adjustment process is necessary and further adjustment processes by way of trial and error can be omitted.

In the illustrated embodiment, the adjustable component 5 is attached to the lid 1, but it would also be fundamentally possible to attach the adjustable component 5 to the body 3 and the rigid component 4 to the lid 1.

The invention claimed is:

1. A device for fixing the position of a lid of a motor vehicle in the closed position, said lid being movable between an open position and a closed position, in particular the position of the cover of a convertible top compartment, with a component attached to the body of the vehicle, and with a component attached to the lid, and which, when the component attached to the body assumes the closed position, is guided at least in one direction, the component attached to the lid or the component attached to the body having a base plate for connection to the lid or the body and an insertion element which is connected to the base plate, wherein the base plate can be moved by means of a cam pivoted on the plate relative to the lid or the body, the movement of the cam being limited by two stop elements which are attached to the base plate and which are essentially opposite one another wherein the cam is connected to the lid or the body by means of a screw.

2. The device according to claim 1 wherein the screw is guided in a slot in the base plate.

3. The device according to claim 1 wherein the base plate is connected to the lid or the body by means of several screws.

4. The device according to claim 3 wherein the screws are guided in the respective slots in the base plate.

5. The device according to claim 1 wherein the cam has a scale which displays the relative position of the cam (9) to the base plate.

6. The device according to claim 1 wherein the cam has a hexagon for turning it relative to the base plate.

7. The device according to claim 1 wherein the screw is located within the hexagon.

8. The device according to claim 1 wherein on the base plate at least one projection which protrudes at least over part of the cam is attached to hold the cam in its uninstalled state.

9. The device according to claim 1 wherein at least one of the component connected to the body and the component connected to the lid has a slanted surface.

10. The device according to claim 1 wherein the base plate is attached to the lid.

11. A device for positioning a movable member disposed in a first plane and a fixed member disposed in a second plane substantially perpendicular to said first plane, comprising:
   a plate member provided with a set of elongated slots oriented substantially perpendicular to said second plane, a guide portion disposable parallel to said second plane, adjacent said fixed member, and a pair of opposed surfaces disposed substantially parallel to said second plane;
   at least two threaded bolts insertable in at least two of said elongated slots, partially insertable in aligned threaded openings in said movable member to permit displacement of said plate member along the lengths of said slots and fully insertable into said aligned threaded openings to fix the position of said plate member relative to said movable member and said second plane; and
   a cam rotatably mounted on one of said threaded bolts, having a peripheral surface engaging said pair of opposed surfaces for displacing said plate member upon rotation of said cam.

12. A device according to claim 11 wherein said cam is provided with markings to indicate the position of said guide portion of said plate member relative to said movable member.

13. A device according to claim 11 wherein said cam includes a configuration engageable by a tool for rotating said cam.

14. A device according to claim 13 wherein said configuration is hexagonal.

15. A device according to claim 11 wherein at least one of said movable and fixed members is provided with a surface disposed a an angle relative to said second plane, disposable in opposed relation to the other one of said movable and fixed members.

16. A device according to claim 11 wherein said movable member comprises a lid of a motor vehicle and said fixed member comprises a stationary member attached to a portion of said vehicle.

17. A device according to claim 11 wherein said movable member comprises a cover of a convertible top compartment of a vehicle, and said fixed member is attached to a portion of said vehicle.

* * * * *